United States Patent [19]

Donnelly et al.

[11] Patent Number: 4,522,774

[45] Date of Patent: Jun. 11, 1985

[54] INTEGRATED PROCESS FOR THE PRODUCTION OF TEXTURED POLYCAPROLACTAM MULTIFILAMENT YARN

[75] Inventors: Edward N. Donnelly, Anderson, S.C.; Wilhelm A. Haberkorn, Williamsburg, Va.; Gerry A. Hagen, Anderson, S.C.; Thomas R. McGregor, Anderson, S.C.; William Postman, Anderson, S.C.

[73] Assignee: Badische Corporation, Williamsburg, Va.

[21] Appl. No.: 512,822

[22] Filed: Jul. 11, 1983

Related U.S. Application Data

[63] Continuation-in-part of Ser. No. 272,820, Jun. 11, 1981, abandoned.

[51] Int. Cl.³ .................... D01D 5/16; D01D 5/22
[52] U.S. Cl. ........................ 264/168; 264/210.3; 264/210.7; 264/210.8
[58] Field of Search ............ 264/210.3, 210.8, 168, 264/210.2, 210.7

[56] References Cited

U.S. PATENT DOCUMENTS

| | | | |
|---|---|---|---|
| 3,846,532 | 11/1974 | Kubitzek et al. | 264/210.3 |
| 3,854,177 | 12/1974 | Breen et al. | 264/168 |
| 3,975,484 | 8/1976 | Okada et al. | 264/168 |
| 4,042,662 | 8/1977 | Corbin et al. | 264/210.3 |
| 4,070,432 | 1/1978 | Tamaddon | 264/210.3 |
| 4,096,226 | 6/1978 | Martin et al. | 264/168 |
| 4,237,187 | 12/1980 | Raybon et al. | 264/176 F |

FOREIGN PATENT DOCUMENTS

| | | | |
|---|---|---|---|
| 48-32616 | 10/1973 | Japan | 264/210.8 |
| 52-40620 | 9/1975 | Japan | 264/210.8 |

Primary Examiner—James Lowe
Attorney, Agent, or Firm—George F. Helfrich

[57] ABSTRACT

An improvement is provided in an integrated process for the production of textured multifilament yarn from a fiber-forming, thermoplastic, linear, high-molecular-weight polymer of caprolactam by the combination in immediate succession of the procedural steps of melt spinning, drawing, texturing, and packaging. The present improvement combines the following procedural steps with those of melt spinning, drawing, texturing, and packaging:

(1) Lubricating the filamentary polymeric material from the melt spinning step by applying thereto a lubricating composition containing (a) a lubricant, and (b) solvent in an amount of from 0 to 20 percent by weight of the lubricating composition;

(2) Pre-tensioning the lubricated melt spun filamentary polymeric material beyond its elastic limit between a first godet at room temperature, viz. between about 15° and 25° C.; followed by (3) Pre-heating the pre-tensioned filamentary polymeric material on a second godet to a temperature between about 40° and 70° C. prior to the drawing thereof.

10 Claims, 2 Drawing Figures

INTEGRATED PROCESS FOR THE PRODUCTION OF TEXTURED POLYCAPROLACTAM MULTIFILAMENT YARN

CROSS-REFERENCE

This application is a continuation-in-part of our co-pending application Ser. No. 06/272,820 filed June 11, 1981 now abandoned.

BACKGROUND OF THE INVENTION

1. Field of the Invention

The present invention relates generally to plastic article shaping processes. More particularly it relates to the forming of continuous or indefinite length material with crimping or crinkling of strands or filaments.

2. Prior Art Background

Textured multifilament yarn was initially produced according to a procedure comprising three separate stages, viz., spinning, drawtwisting or draw-winding, and texturing. In the interest of increased efficiency and economy, as well as improved product quality, semi-integrated processes such as spin-draw-winding and draw-texturing were later developed. In today's market—where speed, efficiency, economy, and product quality must all be significantly enhanced in order to maintain a competitive position—a fully integrated spin-draw-texturing process is virtually a requirement for most producers. The present invention is an improved spin-draw-texturing process.

3. Statement of Closest Known Prior Art

The closest prior art of which the inventors are aware is set forth below.

1. U.S. Pat. No. 3,975,484, Okada, et al., relates to a process comprising melt spinning non-circular cross section polyamide filaments, which are allowed to cool, treated with a substantially non-aqueous oil, passed around a feed roll having a peripheral speed of more than about 200 meters per minute, passed in contact with a heated body through a contact angle between about 80° and about 160° with the surface temperature of the heated body maintained in the range of about 170°–250° C. and with the radius of surface curvature in the range of about 15–75 mm. The filaments are thereby subjected to one-sided heating and drawing, passed around a heated draw roll having a peripheral speed of more than about 800 meters per minute and a surface temperature of less than about 220° C., whereupon they are passed through a steam jet crimper which is supplied with steam at a temperature in the range of about 200°–350° C. This detailed spin-draw-texturing process differs from the improvement which is the present invention in a number of significant aspects, the most notable being that the reference does not comprehend pre-tensioning the lubricated melt spun filaments beyond the elastic limit thereof at room temperature, viz., between about 15° and 25° C. prior to the drawing thereof, and pre-heating the pre-tensioned filamentary polymeric material to a temperature between about 40° and 70° C. prior to the drawing thereof.

2. U.S. Pat. No. 4,096,226, Martin, et al., relates to an integrated process for the continuous spinning, drawing, and texturing of polyamide filaments, in which the following steps are effected in immediate succession:

(a) melt spinning filaments of polyamide polymers at temperatures between 260° and 295° C. at a spin-draw ratio of between 1:10 and 1:60;

(b) drawing the spun filaments on at least 2 forwarding elements, the initial element having a surface temperature between 50° and 120° C. and the final element having a surface temperature between 80° and 350° C., at a draw ratio such that the drawn filament, on leaving the drawing stage, has an extensibility of between 10 and 50 percent; and (c) texturing the drawn filaments at a velocity of between 800 and 3,000 meters per minute by an air jet process wherein the overfeed in the texturing stage is from 10 to 50 percent, and the filament temperature, prior to texturing, is between 50° and 180° C. Not comprehended in this reference is the requirement in the present invention that the following cooperative combination of steps must be employed:

(a) Lubricating the filamentary polymeric material from the melt spinning step by applying thereto a lubricating composition comprising (1) a lubricant and (2) a solvent in an amount of from 0 to 20 percent by weight of the lubricating composition;

(b) Pre-tensioning the lubricated melt spun filamentary polymeric material beyond its elastic limit at room temperature, viz., between about 15° and 25° C. prior to the drawing thereof; followed by (c) Pre-heating the pre-tensioned filamentary polymeric material to a temperature between about 40° and 70° C. prior to the drawing thereof.

3. U.S. Pat. No. 3,939,639, Ellegast, relates to a continuous process for the production of textured multifilament yarns from synthetic thermoplastic high molecular weight polymers by spin-draw-texturing, wherein the unstretched multifilament yarn is directed from the spinning phase to the draw-texturing phase through tubes made of metal, plastics, glass, or ceramics. Nowhere taught or suggested in this reference is the requirement in the present invention that the following cooperative combination of steps must be employed:

Pre-tensioning the lubricated melt spun filamentary polymeric material beyond its elastic limit at room temperature, viz., between about 15° and 25° C. prior to the drawing thereof; followed by Pre-heating the pre-tensioned filamentary polymeric material to a temperature between about 40° and 70° C. prior to the drawing thereof.

4. U.S. Pat. No. 3,854,177, Breen, et al., relates to a process and apparatus for texturing continuous multifilament yarn at high speeds to increase the bulk thereof. A stream of hot compressible fluid is jetted to form a turbulent region, into which the filamentary yarn is passed. The filamentary yarn is removed from the fluid stream by means of a foraminous surface, whereupon it is cooled with fluid on the foraminous surface to set the crimp prior to the imposing of any substantial tension thereon. In FIG. 3; in Col. 3, lines 64–68; and in Col. 4, line 66 to Col. 5, line 11, reference is briefly made to an integrated spin-draw-texturing process. However, nowhere is it taught or suggested that the following cooperative combination of procedural steps, which is the improvement of the present invention, should be followed:

(a) Lubricating the filamentary polymeric material from the melt spinning step by applying thereto a lubricating composition comprising (1) a lubricant and (2) solvent in an amount of from 0 to 20 percent by weight of the lubricating composition, (b) Pre-tensioning the lubricated melt spun filamentary polymeric material beyond its elastic limit at room temperature, viz., between about 15° and 25° C. prior to the drawing thereof; followed by (c) Pre-heating the pre-tensioned filamentary polymeric material to a temperature between about 40° and 70° C. prior to the drawing thereof.

5. U.S. Pat. No. 4,070,432, Tamaddon, discloses the procedural steps of lubrication, pretensioning, and forwarding on cold feed rolls, in a process for the production of a low shrinkage polyester. To be sure, one of skill in the art could not predict in advance that process parameters applicable in Tamaddon's polyester process would have any utility whatever in applicants' instant nylon 6 (polycaprolactam) process. Moreover, Tamaddon's purpose is the production of a high tenacity, low shrinkage industrial yarn, which is untextured. Consequently, one of skill in the art would not even look to Tamaddon to find a solution to a problem in respect of the production of textured multifilament polycaprolactam yarn. That is to say, there is no reason why one of skill in the art would combine Tamaddon with any known reference or other texturing conditions to result in a process like applicants' integrated process for the production of textured multifilament polycaprolactam yarn.

Furthermore, pre-tensioning as taught by Tamaddon means tensioning necessary to provide yarn stability on the succeeding rolls. (See Col. 2 line 54 ff. of the Tamaddon reference.) On the other hand, the present invention requires pre-tensioning beyond the elastic limit of the fiber, the inventors having discovered that pre-tensioning below the elastic limit was not adequate for the successful operation of their process.

6. Japanese Pat. No. 48-32616 discloses the processing of nylon 66 for the purpose of producing an untextured, high tenacity tire cord fiber. The process is characterized by a three-step drawing operation within specifically-defined temperature ranges. In sharp contradistinction thereto, the present invention is directed to an integrated process for the production of textured polycaprolactam multifilament yarn by the combination in immediate succession of the procedural steps of melt spinning, one-step drawing, and texturing. Because nylon 6 (polycaprolactam) and nylon 66 do not generally respond in the same fashion to the same process parameters, one of skill in the art would not be in a position to predict that conditions taught by the Japanese patent would find any applicability in applicants' process. Moreover, since the purpose of the Japanese patent is to produce untextured, high tenacity fiber, such as tire cord, one of skill in the art wold not event look to the Japanese patent for any process parameters to be combined with any known texturing conditions to result in a process like applicants'. If certain narrowly-defined parameters found in the Japanese patent could in fact be combined with texturing conditions known in the art or other texturing conditions, the results of such a combination would indeed be surprising.

Furthermore, it must be pointed out that applicants' invention requires a pretensioning of the lubricated melt spun nylon 6 filaments beyond the elastic limit thereof at a temperature between about 15° and 25° C. prior to the one-step drawing thereof. In contrast thereto, the spin-draw process for nylon 66 of the Japanese patent comprehends a first drawing step subsequent to oiling, the draw ratio being anywhere in the range 1.01 to 1.25X. This initial drawing step is followed by heating from 50° to 120° C., which is in turn followed by two additional zones of drawing. Accordingly, applicants' pretensioning beyond the elastic limit is not specifically pointed out in the broad, general teachings of the Japanese reference, and a multitude of undesirable conditions having no applicability whatever in applicants' process are also included therein.

7. Japanese Kokai No. 52-40620 is directed to a low-fault, high-strength nylon-6 yarn. Employing conditions taught in this reference, it has been found by applicants that completely unacceptable results are obtained, in sharp contrast to the highly beneficial results of applicants' process as defined in the present claims. In this regard, particular reference should be made to Example 5 and FIG. 2, infra.

SUMMARY OF THE INVENTION

The primary object of the present invention is to provide an improvement in the prior art process for the production of textured multifilament yarn from a fiber-forming, thermoplastic, linear, high-molecular-weight polymer of caprolactam by the combination in immediate succession of the procedural steps of melt spinning, drawing, texturing and packaging. The improvement which is the present invention comprises the cooperative combination of the following three procedural steps with those of melt spinning, drawing, texturing and packaging:

(a) Lubricating the filamentary polymeric material from the melt spinning step by applying thereto a lubricating composition comprising (1) a lubricant and (2) solvent in an amount of from 0 to 20 percent by weight of the lubricating composition;

(b) Pre-tensioning the lubricated melt spun filamentary polymeric material beyond its elastic limit between a first godet at room temperature, viz., between about 15° and 25° C.; followed by (c) Pre-heating the pre-tensioned filamentary polymeric material on a second godet to a temperature between about 40° and 70° C. prior to the drawing thereof.

All three procedural steps of the instant improvement are essential. When the improvement is employed, the result is a quality yarn, which is characterized by an insignificant number of broken filaments, and excellent physical properties, such as tenacity, elongation, dyeability, and crimp contraction. Moreover, a very low variance in these yarn characteristics is obtained. As a consequence, the yarn produced by the process of the present invention is eminently suitable for use in the fabrication of carpets, employing standard procedures well-known in the art. When one or more of the three procedural steps of the instant improvement are not employed, a quality yarn is not produced, as evidenced by a significant number of broken filaments, and less than excellent physical properties, such as tenacity, elongation, dyeability, and crimp contraction. Moreover, a wide variance in these yarn characteristics is obtained. Consequently, the yarn so produced which is characteristic of the prior art processes, is not always suitable for use in the fabrication of carpets, employing standard procedures well-known in the art.

BRIEF DESCRIPTION OF THE DRAWING

For a more complete understanding of the present invention, including its primary object and benefits, reference should be made to the Detailed Description of the Preferred Embodiments, which is set forth below. This detailed description should be read together with the accompanying drawings, wherein.

DETAILED DESCRIPTION OF THE PREFERRED EMBODIMENTS

Figure 1:
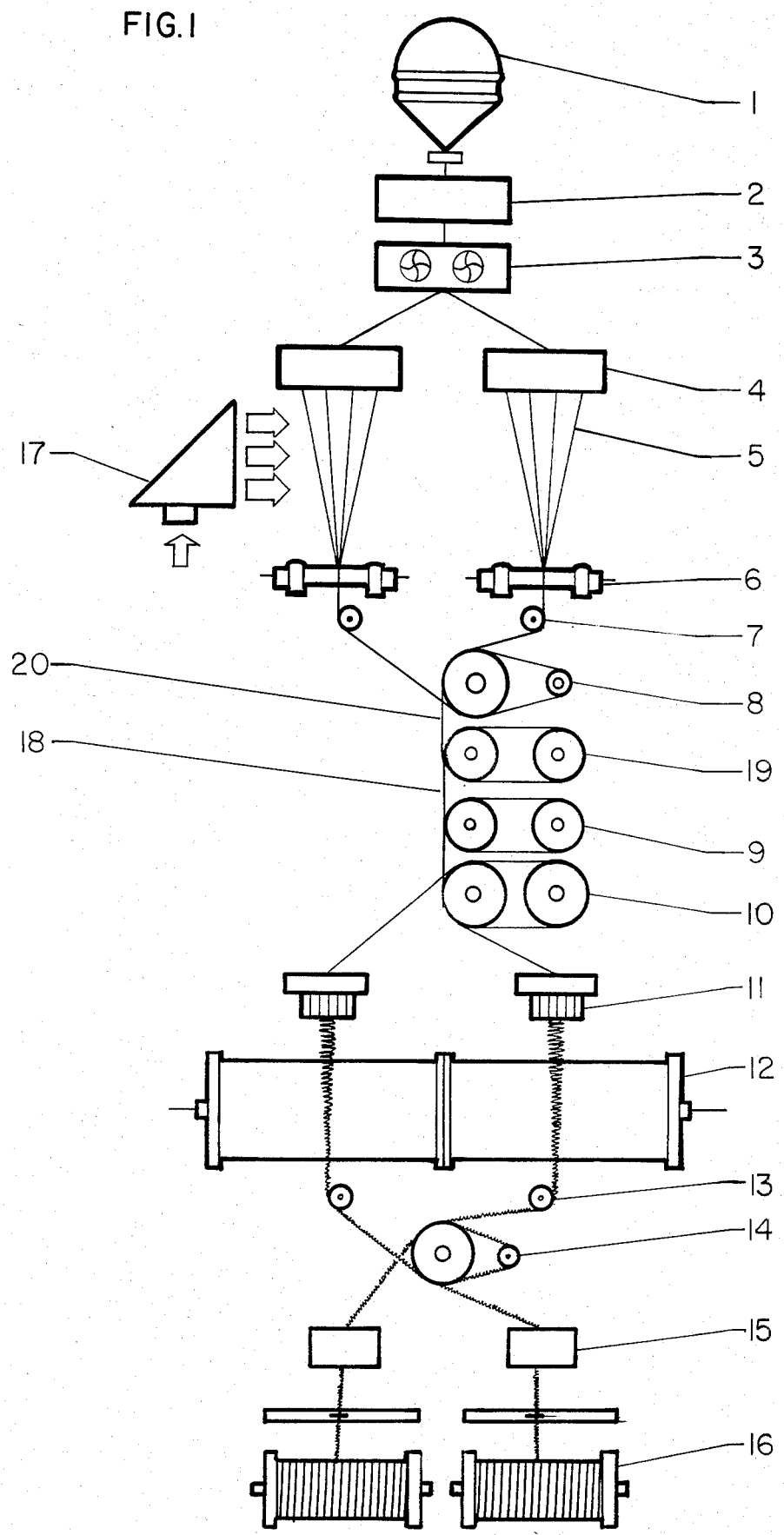
FIG. 1 schematically depicts certain preferred embodiments according to the improved process which is the present invention.

Referring now to the FIG. 1, a number of particularly preferred embodiments according to the present invention are shown. Supply tank (1) contains the fiber-forming, thermoplastic, linear, high-molecular-weight polymer of caprolactam to be spun, preferably in chip form. The polymer from supply tank (1) is melted in a standard melt extruder (2), whereupon the molten polymer is directed into a metering pump, preferably two metering pumps (3), as shown in the drawing, which pumps are readily available commercially. Metering pumps (3) cause two polymer streams to pass individually into separate standard spinnerette packs (4), whence each individual polymer stream is spun through a spinnerette having the desired number of holes of a chosen shape to form molten filamentary polymeric strands (5). Before entering the spinnerette holes, each polymer stream has been filtered, as is generally employed and well understood by those of skill in the art. The particular temperature for the polymer in spinnerette packs (4) depends upon the actual molecular weight of the polymer, as is well known by those of skill in the art.

Molten filamentary polymeric strands (5) are quenched by means of standard quench cabinet (17), which provides a flow of transversely moving cooling gas, especially air, as shown by the arrows. The two groups of solidified filamentary polymeric strands are then individually configured in separate close-packed, essentially monofilamentary layers, to each of which a lubricating composition is applied by means of finish applicators (6). The lubricating composition applied comprises a lubricant, and solvent in an amount of from 0 to 20 percent by weight of the lubricating composition. The finish applicators are any of a number of those known by the skilled artisan, e.g., those described in U.S. Pat. No. 3,893,412. Guides (7) are employed to separately direct the individual lubricated multifilament groups around a standard, commercially-available, unheated pre-tensioning godet and separator roll (8). In one embodiment of the invention, the multifilament groups (20), which have been straightened at ambient temperatures below the elastic limit thereof, are passed around storage rolls (9), which afford a means for providing a residence time of between about 1 and 5 seconds for the straightened filamentary polymeric material.

Storage rolls (9), which are large, unheated, standard godets traveling at a low rate of speed, provide that residence time which is sufficient to allow moisture migration to occur within the filamentary polymeric material, in order to ensure that subsequent drawing thereof can be accomplished without breakage of the filaments. Such a residence time is necessary when the lubricating composition contains water in an amount of greater than about 15 percent by weight of the lubricating composition. Such a residence time is not necessary when the lubricating composition contains only the lubricant, or lubricant and water in an amount of less than about 15 percent by weight of the lubricating composition. Under the latter conditions, the multifilament groups (18) from the unheated pre-tensioning godet and separator roll (8) bypass the storage rolls (9), and having been pre-tensioned beyond the elastic limits thereof at ambient temperatures, they are pre-heated and then drawn, for example, between a first set of standard heated drawrolls (19) and a second set of standard heated drawrolls (10) as shown in the drawing.

The two individual multifilament groups, or threadlines, are then directed to separate texturing units (11), in order to produce a bulky multifilament yarn, which is discharged in crimped form onto commercially-available cooling belts (12). Directing the threadline into the individual texturing units can be conveniently accomplished by means of the devices disclosed in U.S. Pat. No. 4,280,260. The texturing units are preferably fluid jet texturing units well-known to those of skill in the art and exemplified by those described in U.S. Pat. Nos. 3,714,686, 3,908,248 and 3,950,831. The textured yarn is removed from cooling belts (12) by means of standard takeaway godet (14) and guides (13); and is, in one embodiment, directed immediately to fluid interlacing jets (15), which provide entanglement of the individual filaments as desired. If no entanglement is necessary or desired, the textured yarn is caused to bypass interlacing jets (15), passing directly to standard, commercially-available take-up winders (16), by means of which the yarn is wound into packages for subsequent use and/or sale as bulked continuous filament for employment in upholstery fabrics and/or carpets. The fluid interlacing jets employed are any of a number of those well-known to the skilled artisan, such as those described in U.S. Pat. Nos. 3,115,691 and 3,125,793.

All of the procedural steps specified hereinabove are accomplished in immediate succession, thereby affording an integrated process, wherein all steps combine cooperatively to give the desired result.

As outlined above, filamentary polycaprolactam from the melt spinning step is first cooled and then lubricated by applying thereto a lubricating composition comprising (a) a lubricant and (b) solvent in an amount of from 0 to 20 percent by weight of the lubricating composition. This lubricated, melt-spun filamentary polymeric material is then pre-tensioned at room temperature beyond its elastic limit, after which it is pre-heated to a temperature between about 40° and 70° C. before being drawn.

Especially advantageous results are obtained when the solvent employed in the lubricating composition is water in an amount between about 0 and about 15 percent by weight of the lubricating composition. Under these conditions, the pre-heating of the pre-tensioned filamentary polymeric material is beneficially accomplished at a temperature between about 40° and 70° C. prior to the drawing step.

The very best results are achieved if the lubricant is a member selected from the group consisting of polyalkoxylated alcohols, polyalkoxylated thiols, polyalkoxylated acids, and polyalkoxylated phenols, and water is present in the lubricating composition in an amount of 0 to 15 percent by weight of the lubricating composition. Moreover, it is desirable to apply the lubricating composition uniformly over the width and along the length of the filamentary polycaprolactam so that a level of from 0.2 to 2 percent by weight of lubricant, based on the weight of the polymer, is achieved. Such uniform application is achieved by means of devices such as those described in U.S. Pat. No. 3,893,412. The polyalkoxylated alcohols and polyalkoxylated thiols are of the type described in U.S. Pat. No. 4,111,818; the polyalkoxylated acids are of the type described in U.S. Pat. No. 4,110,227; and the polyalkoxylated phenols are of the type described in U.S. Pat. No. 2,674,619. Equally beneficial results are achieved if the following are also employed as lubricants: vegetable triglycerides (such as coconut oil), polyalkoxylated adducts of natural and synthetic esters of glycerol (such as glycerol monolaurate ethoxylated with 23 moles of ethylene oxide by standard techniques well-known to those of skill in the art), and phosphate antistatic agents (such as those available under the designation G-2200 from ICI Americas, Inc.).

When the lubricating composition which is applied to the solidified filaments from the melt spinning step contains solvent, especially water, in an amount of greater than about 15 percent by weight of the lubricating composition, the lubricated filamentary polymeric material is first straightened below the elastic limit thereof, as described hereinabove, after which a residence time is provided for the straightened filamentary polymeric material prior to pre-tensioning thereof at essentially ambient temperatures beyond the elastic limits thereof followed by pre-heating of the pre-tensioned filamentary polymeric material to a temperature between about 40° and 70° C. Whereas a residence time of 0.5 seconds or less has been shown to be unsatisfactory, a residence time of from 1–5 seconds has been shown to be sufficient to afford moisture migration within the filamentary polymeric material, whereby subsequent drawing thereof can be accomplished without breakage of the individual filaments. As described hereinabove with particular reference to the drawing, this residence time is conveniently provided by means of storage rolls (9), which are standard, unheated godets traveling at a low speed.

Melt spinning through the spinnerette holes in spinnerette pack (4) referred to above is advantageously carried out at a temperature between about 250° and 290° C., whereby individual melt spun filaments are produced having a modification ratio of from 1 to 4, as understood by those of skill in the art, at a polymer throughput of 0.1 to 0.4 grams/minute x (textured dtex x number of threadlines employed). The filaments are advantageously quenched by means of air at a temperature between about 5° and 20° C. and a relative humidity between about 40 and 90 percent. The residence time of polymer in spin duct is beneficially between about 0.1 and 1 seconds.

The pre-tensioning subsequent to application of the lubricating composition is beneficially carried out at essentially ambient conditions by stretching the polycaprolactam filaments between about 1 and 3 percent of the length thereof. These conditions appertain when solvent, especially water was present in the applied lubricating composition in an amount of 0 to 15 percent.

The filamentary polycaprolactam which has been pre-tensioned as described in detail immediately above is advantageously drawn by first ensuring that the filamentary polymeric material is at a temperature between about 40° and 70° C., whereupon the filamentary polycaprolactam is stretched in a single zone at a draw ratio of from about 2.8 to 3.6, followed by heating the stretched filamentary polymeric material to a temperature between about 120° and 190° C. Under such conditions it is especially beneficial if the elapsed time between the conclusion of the lubrication step and the conclusion of the drawing step is between about 0.1 and 2 seconds.

However, if the pre-tensioned filamentary polymeric material was lubricated with a lubricating composition which comprised solvent, especially water in an amount of greater than about 15 percent by weight of the lubricating composition, as described hereinabove, drawing is most advantageously accomplished by first ensuring that the pre-tensioned filamentary polymeric material is brought to a temperature between about 40° and 70° C., whereupon the filamentary polymeric material is stretched in a single zone at a draw ratio of from about 2.5 to 3.5. Thereupon the stretched filamentary polymeric material is heated to a temperature between about 120° and 190° C. Under such conditions it is especially beneficial if the elapsed time between the conclusion of the lubrication step and the conclusion of the drawing step is between about 1 and 7 seconds.

At the conclusion of the drawing step, texturing of the drawn filamentary polymeric material is conveniently and advantageously accomplished by fluid jet means. For this purpose, devices such as those described in U.S. Pat. Nos. 3,714,686 and 3,908,248 have been found to be especially advantageous. Fluid temperatures between about 200° and 400° C. are utilized at a flow rate of 15 normal cubic meters per hour or less. The textured filamentary polymeric material is immediately cooled by means of a fluid to a temperature of less than about 30° C. without any stress on the filaments, while they are kept in an essentially tensionless state on cooling belts or the like, as outlined hereinabove.

Thereupon the cooled textured filamentary polycaprolactam is wound into a package by standard means, or subsequent utilization or sale. Convenience and efficacy are the results when the texturing and cooling fluids are air, and when the texturing process is accomplished with a plurality of threadlines, each entering the fluid texturing device at a linear velocity greater than 1500 meters per minute, and wherein the individual threadlines have a weight to length ratio of between about 500 and 3000 dtex.

If interlacing is required or desired for any purpose, a separate interlacing step may be employed following the conclusion of the texturing operation. Such interlacing is effectively accomplished by the utilization of any of a number of fluid jet interlacing means known to those of skill in the art, such as those devices described in U.S. Pat. Nos. 3,115,691 and 3,125,793, among many others. In this embodiment the textured filamentary polycaprolactam is passed through the fluid jet means after cooling of the textured filamentary polycaprolactam to a temperature of less than about 30° C. has been effected without stress on the individual filaments, which are kept in an essentially tensionless state on cooling belts or the like, as outlined hereinabove.

Resulting from especially preferred embodiments of the process of the present invention as described above is a textured multifilament yarn having the following characteristics:

| | |
|---|---|
| Tenacity (grams/dtex) | 2.1–2.9 |
| Elongation (percent) | 35–55 |
| Boiled shrinkage (percent) | 2–6 |
| Crimp contraction (employing hot air at 150° C.) (percent) | 10–18 |
| Bulk (boiled) (percent) | 7–15 |
| Broken filaments/km | 0–0.5 |

The following examples, which are not limiting but illustrative only, provide a more complete understanding of the present invention, including its primary benefits and advantages over the prior art.

EXAMPLE 1

This example illustrates the use of pre-tensioning and low pre-heat prior to drawing when an essentially non-aqueous finish is used. Nylon-6 (polycaprolactam) chips having a relative viscosity of 2.69 as measured in 96–98 percent sulfuric acid and containing less than 0.01 percent titanium dioxide were melted in an extruder and spun at a temperature of 270° C. through two spinnerettes with 68 irregular shaped holes each at a thruput of 230 grams per minute per spinnerette [(0.161 grams per minute × textured dtex × number of threadlines) = (0.161 × 1430 dtex × 2) = 460] forming two 68 filament threadlines. The spun filaments were quenched with a cross flow of air at approximately 12° C., were lubricated with a non-aqueous spin finish of the polyalkoxylated acid group, and were wrapped around an unheated pre-tensioning godet that established a spinning speed of 645 meters per minute. The threadlines were pre-tensioned, at levels ranging from 0.039 pond/dtex (below the elastic limit) to 0.238 pond/dtex (above the elastic limit) representing a stretch of 0.5 percent to 2.0 percent respectively, by establishing a differential speed between the pre-tensioning godet and a first heated godet pair. The pre-tensioned threadlines were heated on the first godet pair at levels of 35°, 45°, and 55° C., and were immediately drawn in a single zone to a speed of 2000 meters per minute by wrapping the threadlines around a second heated godet pair. The quality of the drawn threads was evaluated by monitoring the number of broken filaments generated at each of the pre-tension and first godet temperature levels followed by physical property analysis. The following table clearly shows the advantages of pre-tensioning and low temperature pre-heating:

| Pre-Tension Level g/dtex (% Stretch) (Based on Spun, Undrawn Dtex) | Pre-Heat Temperature °C. | Broken Filaments per Minute per Threadline[1] | Fiber Tenacity g/dtex | Fiber Elongation at Break (%) |
| --- | --- | --- | --- | --- |
| 0.039 (0.5%)[2] | 35[2] | 15.0 | 3.12 | 35.2 |
| 0.238 (2.0%) | 35[2] | 0.8 | 3.28 | 36.7 |
| 0.039 (0.5%)[2] | 45 | 1.6 | 3.19 | 36.5 |
| 0.238 (2.0%) | 45 | 0.1 | 3.42 | 37.3 |
| 0.039 (0.5%)[2] | 55 | 2.7 | 3.22 | 38.3 |
| 0.238 (2.0%) | 55 | 0.0 | 3.38 | 38.3 |

NOTE:
[1]Less than 0.3 broken filaments per minute per threadline is considered acceptable.
[2]Not the present invention - for comparative purposes. This illustrates that pre-tension and pre-heat levels slightly different from those of the present invention result in an unacceptable product.

EXAMPLE 2

(Not This Invention—For Comparative Purposes)

This example illustrates the unsatisfactory fiber properties obtained when high water content finish, no pretension, and normal pre-heat conditions are used.

Nylon-6 chips having a relative viscosity of 2.69 as measured in 96–98 percent sulfuric acid and containing 0.3 percent titanium dioxide were melted in an extruder and spun at a temperature of 251° C. through a spinnerette with 136 irregular shaped holes at a thruput of 415 grams per minute forming a 136 filament thread-line. The spun filaments were quenched with a crossflow of air at approximately 10° C., were lubricated with a 16.5 percent oil in water emulsion with an oil in the triglyceride group, and were wrapped around a first heated godet pair rotating at a speed of 500 meters per minute. Runnable drawing performance could not be achieved until the first godet pair was at a temperature above 120° C., which is in the normal range for the discontinuous multistep process, wherein undrawn feeder yarns conditioned in the standard manner are employed. Drawing was accomplished at temperatures of 120° to 150° C. at a draw ratio of 3.5X. The following table illustrates that at best only poor drawing performance was achieved and the fiber physical properties of tenacity and elongation were characteristic of a marginally acceptable pre-textured fiber.

| Pre-Heat Temperature °C. | Broken Filaments per Minute | Fiber Tenacity g/dtex | Fiber Elongation at Break (Percent) |
| --- | --- | --- | --- |
| 120 | 26.0 | 3.09 | 52.0 |
| 130 | 2.0 | 3.27 | 58.5 |
| 140 | 1.4 | 2.64 | 49.3 |
| 150 | 1.8 | 2.45 | 46.2 |

EXAMPLE 3

This example illustrates the effects of water in finish and how excellent tenacity and elongation with low broken filaments are obtained.

Nylon-6 chips having a relative viscosity of 2.69 as measured in 96–98 percent sulfuric acid and containing less than 0.01 percent titanium dioxide were melted in an extruder and spun at a temperature of 270° C. through two spinnerettes with 68 irregular shaped holes each at a thruput of 235 grams per minute per spinnerette forming two 68 filament threadlines. The spun filaments were quenched with a crossflow of air at approximately 12° C., and were lubricated with an oil spin finish of the alkoxylated alcohol group that contained varying levels of water from essentially 0 to 30 percent. The fiber was stretch pre-tensioned 2 percent, pre-heated to 60° C., and stretched 3.35X to a speed of 2000 meters per minute. The fiber finished with 30 percent water exhibited good tenacity and elongation, 4.2 g/dtex and 34.5 percent, but unacceptable broken filament performance—0.9 filament breaks per minute. The fiber finished without water exhibited good tenacity and elongation as well as a good low break frequency—4.1 g/dtex at 34.5 percent elongation and 0.2 filament breaks per minute.

EXAMPLE 4

(This Invention)

This example describes one possible operational condition of the process and its high productivity level.

Nylon-6 chips having a relative viscosity of 2.69 as measured in 96–98 percent sulfuric acid and containing less than 0.01 percent titanium dioxide were melted in an extruder and spun at a temperature of 265° C. through two spinnerettes with 99 irregular shaped holes each at a thruput of 335 grams per minute per spinnerette forming two 99 filament threadlines. The spun filaments were quenched with a crossflow of air at approximately 12° C., and were lubricated with an oil spin finish of the polyalkoxylated alcohol group that contained essentially no water. The fiber was stretch pre-tensioned 1½ percent, pre-heated to 45° C., and stretched 3.25× to a speed of 2119 meters per minute and heated to 165° C. The stretched threadlines were crimped in a hot air texturizer such as that in U.S. Pat. No. 3,908,248 and deposited onto a rotating cooling sieve through which air was moved by means of a vacuum. The sieve moved at a velocity of 45 meters per minute. The threadlines were unraveled from their plug on the cooling sieve to a speed of 1732 meters per minute established by a cold pair of godets. The yarns were subsequently interlaced in a conventional air jet and wound up under 200 pond tension on a double cup winder.

Some of the fiber produced was processed in a commercial space dyeing operation and exhibited excellent uniformity and bulk/cover. Other fiber was commercially cabled, continuously heatset, tufted, and dyed into an excellent residential type carpet.

The fiber exhibited physical properties common to Bulked Continuous Filament (BCF) products including:

| | |
|---|---|
| Dtex | 1990 |
| Tenacity | 2.3 g/dtex |
| Elongation at Break | 40 percent |
| Tank Bulk in Hot Water* | 10.2 percent |
| Dyeability | Piece dyeable in Acid Red; absence of noticeable streaks in Ortalon Blue G |

*Tank Bulk was determined by measuring the length change in a skein of fiber exposed to boiling water under two loads of approximately 0.0003 g/dtex ($L_2$) and 0.09 g/dtex ($L_1$), respectively. Bulk was calculated by the following equation:

$$\text{Bulk} = \frac{L_1 - L_2}{L_1} \times 100$$

EXAMPLE 5

Figure 2:
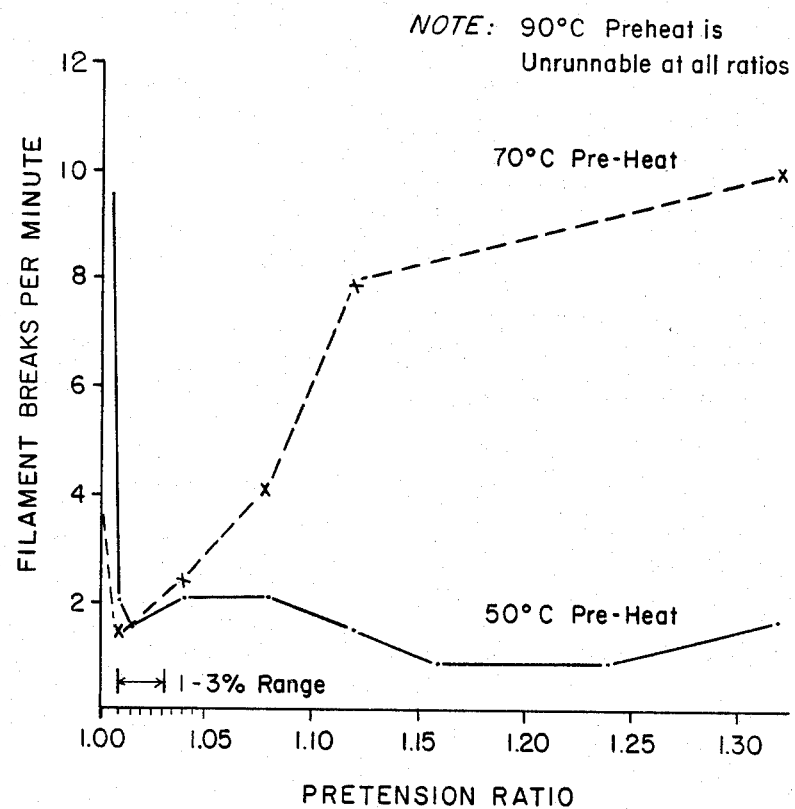
FIG. 2 is a plot of parameters which shows benefits of the present invention when compared with the prior art.

This example illustrates the unsatisfactory broken filament properties obtained when pre-tension and pre-heat levels are in excess of those of the present invention, esp. the levels disclosed in Japanese Pat. No. 48-32616 (Matsumoto), supra, and Japanese Kokai No. 52-40620, supra. A procedure essentially identical to that of Example 3 was followed, except that: (a) the spin finish was applied in neat form; (b) the fiber pre-tension was varied from 0 percent to 32 percent, i.e., a pre-tension ratio of 1.00 to 1.32; (c) the total stretch ratio was fixed at 3.40X, wherein the pre-heat temperature was varied from 50° to 90° C.; and (d) the drawing speed was 2200 meters/minute at a throughput of 255 grams per minute per spinnerette. The results obtained are shown in FIG. 2, which is a plot of filament breaks per minute versus pre-tension ratio at various pre-heat temperatures. At the draw ratio chosen in this example, a clear advantage is evidenced for pre-tensioning according to the present invention (viz. 1–3 percent) at pre-heat temperatures in the range of 40°–70° C., when compared with the recommendation of the Japanese patent and Japanese Kokai, supra, viz., pre-tension levels up to 25 percent and pre-heat temperatures up to 120° C. and 100° C., respectively. Sensitivity to pre-heat temperature is minimized in the 1–3 present range of the present invention.

Although the present invention has been described in detail with respect to certain preferred embodiments thereof, it is understood by those of skill in the art that modifications and variations in this detail may be effected without any departure from the spirit and scope of the present invention, as defined in the hereto-appended claims.

We claim:

1. In the integrated process for the production of textured multifilament yarn from a fiber-forming, thermoplastic, linear, high-molecular-weight polymer of caprolactam by the combination in immediate succession of the procedural steps of melt spinning, drawing, texturing and packaging: the improvement therein which comprises the cooperative combination of the following procedural steps with those of melt spinning, drawing, texturing, and packaging:

(a) Lubricating the filamentary polymeric material from the melt spinning step by applying thereto a lubricating composition comprising (1) a lubricant and (2) solvent in an amount of from 0 to 20 percent by weight of the lubricating composition;

(b) Pre-tensioning the lubricated melt spun filamentary polymeric material beyond its elastic limit between a first godet at room temperature, viz. between about 15° and 25' C. followed by (c) Pre-heating the pre-tensioned filamentary polymeric material on a second godet to a temperature between about 40° and 70° C. prior to the drawing thereof.

2. The process of claim 1, wherein the solvent is water in an amount of from 0 to 15 percent by weight of the lubricating composition.

3. The process of claim 2, wherein the lubricating composition is applied uniformly over the width and along the length of the melt spun filamentary polymeric material so that a level of from 0.2 to 2 percent by weight of lubricant, based on the weight of the polymer, is achieved.

4. The process of claim 2, wherein the lubricant is a member of the group consisting of polyalkoxylated alcohols, polyalkoxylated thiols, polyalkoxylated acids, polyalkoxylated phenols, vegetable triglycerides, polyalkoxylated adducts of natural and synthetic esters of glycerol, and phosphate antistatic agents, and water is present in an amount of 0 to 15 percent by weight of the lubricating composition.

5. The process of claim 2, wherein the melt spinning is carried out at a temperature between about 250° and 290° C., to produce individual melt spun filaments having a modification ratio of from 1 to 4, at a polymer throughput of 0.1 to 0.4 grams/minute x (textured dtex x number of threadlines employed), the filaments being quenched in air at a temperature between about 5° and 20° C. and a relative humidity between about 40 and 90 percent, wherein the residence time in the spin duct is between about 0.1 and 1 seconds.

6. The process of claim 2, wherein the lubricated polycaprolactam filaments are stretched between about 1 and 3 percent of the length thereof.

7. The process of claim 2 wherein the pre-tensioned filamentary polymeric material is drawn by:
(a) Ensuring that the filamentary polymeric material is at a temperature between about 40° and 70° C.;
(b) Stretching the filamentary polymeric material in a single zone at a draw ratio of from about 2.8 to 3.6; followed by
(c) Heating the stretched filamentary polymeric material to a temperature between about 120° and 190° C.; wherein the elapsed time between the conclusion of the lubricating step and the conclusion of the drawing step is between about 0.1 and 2 seconds.

8. The process of claim 2, wherein texturing is accomplished by fluid jet means at a fluid temperature between about 200° and 400° C., employing a fluid flow rate of less than 15 normal cubic meters per hour; whereupon the textured filamentary polymeric material is cooled by means of a fluid to a temperature of less than about 30° C. without stress, while the filaments are in an essentially tensionless state, and then wound into a package for subsequent utilization.

9. The process of claim 8, wherein the texturing and cooling fluids are air.

10. The process of claim 8 which additionally comprises fluid jet means for the subsequent interlacing of the textured filamentary polymeric material, after cooling thereof to a temperature of less than about 30° C. has been effected without stress while the filaments are in an essentially tensionless state.

* * * * *